United States Patent
Miyata et al.

(10) Patent No.: US 7,396,786 B2
(45) Date of Patent: Jul. 8, 2008

(54) GLASS AND GLASS SUBSTRATE HAVING HIGH DIELECTRIC CONSTANT

(75) Inventors: Masaaki Miyata, Sagamihara (JP); Kazuo Ohara, Yokohama (JP)

(73) Assignee: Kabushiki Kaisha Ohara, Kanagawa (JP)

(*) Notice: Subject to any disclaimer, the term of this patent is extended or adjusted under 35 U.S.C. 154(b) by 747 days.

(21) Appl. No.: 10/501,546

(22) PCT Filed: Jan. 22, 2003

(86) PCT No.: PCT/JP03/00559

§ 371 (c)(1),
(2), (4) Date: Jul. 16, 2004

(87) PCT Pub. No.: WO03/062162

PCT Pub. Date: Jul. 31, 2003

(65) Prior Publication Data

US 2005/0113239 A1    May 26, 2005

(30) Foreign Application Priority Data

Jan. 24, 2002    (JP)    ............................. 2002-015394

(51) Int. Cl.
C03C 3/16    (2006.01)
C03C 3/17    (2006.01)

(52) U.S. Cl. ............................. 501/45; 501/46; 501/47; 501/48

(58) Field of Classification Search .................... 501/45, 501/46, 47, 48
See application file for complete search history.

(56) References Cited

U.S. PATENT DOCUMENTS

| 4,115,131 | A | * | 9/1978 | Ishibashi et al. | ............... 501/42 |
| 4,261,751 | A | * | 4/1981 | Nakamura et al. | ............... 501/42 |
| 6,333,282 | B1 | * | 12/2001 | Nakahata et al. | ............... 501/45 |
| 2004/0018933 | A1 | * | 1/2004 | Ogino et al. | ................... 501/45 |
| 2007/0027016 | A1 | * | 2/2007 | Ogino et al. | ................... 501/45 |

FOREIGN PATENT DOCUMENTS

| JP | A 54-112915 | 9/1979 |
| JP | A 8-26768 | 1/1996 |

* cited by examiner

Primary Examiner—Jerry Lorengo
Assistant Examiner—Elizabeth A Bolden
(74) Attorney, Agent, or Firm—Oliff & Berridge, PLC

(57) ABSTRACT

A glass containing 5 to 25 mass % of $P_2O_5$, 0 to 15 mass % of $B_2O_3$, 0 to 5 mass % of $SiO_2+GeO_2$, 21 to 50 mass % of BaO+SrO, 0 to 3 mass % of $Li_2O+Na_2O+K_2O$, and 35 to 65 mass % of $Nb_2O_5$, not substantially containing PbO, satisfying $Nb_2O_5/(BaO+SrO)=0.85$ to 2.20, having a dielectric constant of 15 or greater, a dielectric loss of $10.0 \times 10^{-4}$ or less, and a resistivity of $1.0 \times 10^{16}$ Ω·cm or more.

18 Claims, No Drawings

GLASS AND GLASS SUBSTRATE HAVING HIGH DIELECTRIC CONSTANT

TECHNICAL FIELD

The present invention relates to a glass having a high dielectric constant and low dielectric loss, preferable as a substrate for electric circuit such as a substrate for high frequency circuit element and flat panel display and the like and a dielectric material.

BACKGROUND ART

It has entered advanced information age as represented by mobile communication, cell phones, satellite broadcasting, satellite communication, CATV and the like, and the communication tends to be performed faster and higher frequency. Furthermore, according to a requirement for the miniaturization of these equipments, the miniaturization of the circuit elements also has been strongly required.

The size of a circuit element for microwave is based on the wavelength of an electromagnetic wave used. An electromagnetic wave transmitting in a dielectric material having a dielectric constant of ($\epsilon$) has a wavelength ($\lambda$) represented by $\lambda=\lambda_0/(\epsilon^{1/2})$ where $\lambda_0$ represents the wavelength in vacuo. Therefore, since the size of the circuit becomes small in inverse proportion to square root of $\epsilon$, a material having high dielectric constant has been required.

Further, relating to a display substrate such as PDP, glass for electric substrate having low alkaline content and high dielectric constant applicable for one having high density, high brightness and low electric consumption is desired. When the dielectric material is used as a capacitor in high frequency and high electric field, the material is required to have large quality constant Q. Since Q is rendered by the relational expression of $Q=1/\tan \delta$ ($\tan \delta$: dielectric loss), a material having low dielectric loss is required.

Conventionally, borosilicate glass containing large amount of PbO component is known as a glass having comparatively high dielectric constant as described above. For example, $SiO_2$—RO (R is a alkaline-earth metal) —($TiO_2+ZrO_2+SnO_2$)—PbO system glass is disclosed in Tokukaihei-3-297008A, and $SiO_2$—PbO—$Al_2O_3$ system glass is disclosed in Tokukaihei-4-16527A and Tokukaihei-4-108631A.

It is to be noted that $P_2O_5$—$B_2O_3$—$Nb_2O_5$ system glass is known as an optical glass having high refractive index (Tokukaisho-52-132012A and Tokukaihei-8-104537A, etc.). However, the glass containing no PbO component is required in an environmental viewpoint.

However, since this glass contains large amount of alkaline, it has low resistance property to voltage because of high mobility thereof. Therefore, it is not suitable for a substrate of a high frequency circuit element and electric circuit.

The object of the present invention is to provide a material suitable as a substrate for such as a high frequency circuit element, display and the like, where the material is a glass having high dielectric constant, low dielectric loss and comparatively low alkaline content, in which the defects seen in the above-described earlier development is totally improved.

DISCLOSURE OF INVENTION

The present inventors has studied and researched in order to achieve the above-described object, and finally has found that the glass substrate has a remarkably high dielectric constant and low dielectric loss in $P_2O_5$—RO (R is alkaline metal earth) —$Nb_2O_5$ system glass having a composition within specific range, which has not been disclosed concretely in prior art. Thus the present inventor has accomplished the invention.

That is, according to the first aspect of the invention, the glass of the present invention comprises following components by mass %.

| | |
|---|---|
| $P_2O_5$ | 5-25% |
| BaO + SrO | 21-50% |
| $Nb_2O_5$ | 35-65% |
| $Li_2O + Na_2O + K_2O$ | 0-3% |

The glass of the present invention preferably comprises following components by mass %.

| | |
|---|---|
| $P_2O_5$ | 5-25% |
| $B_2O_3$ | 0-15% |
| $SiO_2 + GeO_2$ | 0-5% |
| BaO + SrO | 21-50% |
| MgO + CaO | 0-25% |
| $Nb_2O_5$ | 35-65% |
| $TiO_2$ | 0-15% |
| $Ta_2O_5$ | 0-15% |
| $Bi_2O_3$ | 0-15% |
| ZnO | 0-15% |
| $WO_3$ | 0-15% |
| $Y_2O_3 + La_2O_3 + Gd_2O_3$ | 0-15% |
| $Li_2O + Na_2O + K_2O$ | 0-3% |
| $Al_2O_3$ | 0-5% |
| $Sb_2O_3$ | 0-0.5% |

The glass more preferably comprises following components by mass %;

| | |
|---|---|
| $P_2O_5$ | 5-20% |
| $B_2O_3$ | 0-10% |
| $SiO_2 + GeO_2$ | 0-5% |
| BaO | 21-50% |
| MgO + CaO | 0-25% |
| $Nb_2O_5$ | 35-65% |
| $TiO_2$ | 0-15% |
| $Ta_2O_5$ | 0-15% |
| $Bi_2O_3$ | 0-15% |
| ZnO | 0-15% |
| $WO_3$ | 0-15% |
| $Y_2O_3 + La_2O_3 + Gd_2O_3$ | 0-15% |
| $Li_2O + Na_2O + K_2O$ | 0-3% |
| $Al_2O_3$ | 0-5% |
| $Sb_2O_3$ | 0-0.5% | wherein $Nb_2O_5/(BaO+SrO)$ is 0.85-2.20.

It is preferable that the glass of the invention is substantially free from PbO component and has a dielectric constant of 15 or more. Further, the glass preferably has a dielectric loss of $10.0 \times 10^{-4}$ or less and an electrical resistivity of $1.0 \times 10^{16}$ $\Omega \cdot cm$ or more.

According to the second aspect of the present invention, the glass substrate of the present invention consists of the above-described glass of the first aspect.

BEST MODE FOR CARRYING OUT THE INVENTION

The following is the reason for limiting the composition of the individual components as described above.

That is, $P_2O_5$ component is an important material as a glass forming oxide, and preferably is contained 5% or more in order to obtain a stable glass having no devitrification. Further, in order to sustain a high dielectric constant, $P_2O_5$ content is 25% or less, preferably 22% or less and particularly preferably 20% or less.

$B_2O_3$, $SiO_2$ and $GeO_2$ components act as glass forming oxides, and are effective in stabilizing the glass. Total content of $B_2O_3$, $SiO_2$ and $GeO_2$ is preferably 0.5% or more and more preferably 1.5% or more. $B_2O_3$ component is preferably 0.5% or more and more preferably 1.5% or more. However, in order to sustain high dielectric constant, $B_2O_3$ content is preferably 15% or less and more preferably 10% or less. Total content of $SiO_2$ and $GeO_2$ components are preferably 5% or less, more preferably 3% or less and particularly preferably 1% or less.

SrO and BaO components are effective in increasing a dielectric constant of the glass. Total content of these components are preferably 21% or more and 50% or less, and more preferably 25% or more and 40% or less. Further, BaO content is preferably 21% or more and more preferably 25% or more.

MgO and CaO components are effective in inhibiting a devitrification of the glass. In order to sustain a high dielectric constant, total content of these components are preferably 25% or less, more preferably 10% or less, and particularly preferably 5% or less.

$Nb_2O_5$ component is effective in improving a dielectric constant. $Nb_2O_5$ content is preferably 35% or more, and from the viewpoint of resistance to devitrification property, preferably 65% or less, more preferably 60% or less and particularly preferably 55% or less. Further, in order to increase a dielectric constant and sustain a stability of the glass, the value of $Nb_2O_5/(BaO+SrO)$ is preferably in the range from 0.85 to 2.2, and more preferably from 0.95 to 1.8.

$TiO_2$, $Ta_2O_5$, $Bi_2O_3$, ZnO, $WO_3$, $Y_2O_3$, $La_2O_3$ and $Gd_2O_3$ components are effective in increasing a dielectric constant. However, from the viewpoint of resistance to devitrification property, these components are preferably 15% or less. Especially, total content of $Y_2O_3$, $La_2O_3$ and $Gd_2O_3$ is preferably 15% or less.

$Li_2O$, $Na_2O$ and $K_2O$ components improve a melting property of the glass. However, alkaline ions have extremely high mobility in the glass so that an electrical resistivity is reduced. Deposition of alkaline components and dielectric breakdown possibly occur under high voltage, the glass preferably contains individual components of 3% or less in total amount and more preferably free from these components.

$Al_2O_3$ component is effective in improving chemical durability of a glass. From the viewpoint of resistance to devitrification property, $Al_2O_3$ content is preferably 5% or less.

$Sb_2O_3$ component is effective as a refining agent. It is enough that the content of $Sb_2O_3$ component is 0.5% or less.

The glass of the invention is preferably free from PbO and $As_2O_3$ components which are environmentally harmful.

It is to be noted that other components such as $Rb_2O$, $Cs_2O$, $TeO_2$, $CeO_2$, SnO components and the like can be added to the glass of the invention within about 5% in total content, if necessary.

It is preferable that the glass and glass substrate of the invention has a dielectric constant of 15 or more, more preferably 16 or more and particularly preferably 17 or more.

The glass and glass substrate of the present invention preferably has electrical resistivity of $1 \times 10^{16}$ Ω·cm or more.

Next, compositions of preferable examples of the glass having a high dielectric constant according to the present invention and comparative examples (mass %) are shown in Tables 1 to 7, accompanied with a dielectric constant (ε) and dielectric loss (tan δ) at 25° C. and 1 MHz, electrical resistivity (ρ/Ω·cm), coefficient of thermal expansion (α/$10^{-7}$ $K^{-1}$) in temperature from 100 to 300° C., refractive index (nd) and Abbe number (vd). In the Tables, the dielectric constant and dielectric loss were measured by impedance measurement system. The electrical resistivity was measured by a high electrical resistance meter produced by Hewlett-Packard Co. As for the coefficient of thermal expansion, rod samples (length of 20 mm×diameter of 5 mm) manufactured by forming the glasses of each example are measured by using a push-rod type thermal dilatometer in temperature from 100 to 300° C.

The examples of glasses according to the invention were obtained by using nitrates, carbonates, phosphates and oxides as the materials thereof, weighing and mixing them, melting and refining them in a platinum crucible at about 1000 to 1500° C. for about 2 to 5 hours, stirring to be homogenous, successively being cast to a metal die, and being annealed.

TABLE 1

| | EXAMPLES | | | |
|---|---|---|---|---|
| | No. 1 | No. 2 | No. 3 | No. 4 |
| $SiO_2$ | | | | 1.0 |
| $B_2O_3$ | 9.9 | 3.9 | 1.9 | |
| $P_2O_5$ | 10.0 | 12.0 | 12.0 | 14.1 |
| $Al_2O_3$ | | | | |
| $Na_2O$ | | | | |
| $K_2O$ | | | | 2.6 |
| BaO | 38.0 | 37.0 | 33.0 | 28.7 |
| $TiO_2$ | | | | 2.2 |
| $Nb_2O_5$ | 42.0 | 47.0 | 53.0 | 51.3 |
| PbO | | | | |
| $Sb_2O_3$ | 0.1 | 0.1 | 0.1 | 0.1 |
| OTHERS | | | | |
| ε | 18.9 | 21.5 | 25.2 | 24.9 |
| tan δ | $8.7 \times 10^{-4}$ | $7.1 \times 10^{-4}$ | $5.7 \times 10^{-4}$ | $6.0 \times 10^{-4}$ |
| ρ/Ω·cm | $2.5 \times 10^{16}$ | $1.7 \times 10^{16}$ | $1.4 \times 10^{16}$ | — |
| α/$K^{-1}$ | $86 \times 10^{-7}$ | $86 \times 10^{-7}$ | $81 \times 10^{-7}$ | $80 \times 10^{-7}$ |
| nd | 1.8894 | 1.9405 | 1.9878 | 1.9646 |
| vd | 26.2 | 24.0 | 22.0 | 21.6 |

TABLE 2

| | EXAMPLES | | | |
|---|---|---|---|---|
| | No. 5 | No. 6 | No. 7 | No. 8 |
| $SiO_2$ | | | | |
| $B_2O_3$ | 1.9 | 12.9 | 12.9 | 9.9 |
| $P_2O_5$ | 12.0 | 7.0 | 7.0 | 10.0 |
| $Al_2O_3$ | | | | |
| $Na_2O$ | | | 2.0 | |
| $K_2O$ | | 2.0 | | |
| BaO | 33.0 | 32.0 | 32.0 | 38.0 |
| $TiO_2$ | 2.0 | | | |
| $Nb_2O_5$ | 51.0 | 46.0 | 46.0 | 37.0 |
| PbO | | | | |
| $Sb_2O_3$ | 0.1 | 0.1 | 0.1 | 0.1 |
| OTHERS | | | | $Bi_2O_3$ 5.0 |
| ε | 25.6 | 19.1 | 19.5 | 18.6 |
| tan δ | $5.6 \times 10^{-4}$ | $6.8 \times 10^{-4}$ | $8.3 \times 10^{-4}$ | $7.5 \times 10^{-4}$ |
| ρ/Ω·cm | — | $2.1 \times 10^{16}$ | $2.1 \times 10^{16}$ | |
| α/$K^{-1}$ | $82 \times 10^{-7}$ | $83 \times 10^{-7}$ | $86 \times 10^{-7}$ | $85 \times 10^{-7}$ |
| nd | 1.9938 | 1.8939 | 1.8966 | 1.8832 |
| vd | 21.6 | 24.8 | 24.9 | 26.7 |

TABLE 3

| | EXAMPLES | | | |
|---|---|---|---|---|
| | No. 9 | No. 10 | No. 11 | No. 12 |
| $SiO_2$ | | | | |
| $B_2O_3$ | 9.9 | 9.9 | 9.9 | 9.9 |
| $P_2O_5$ | 10.0 | 10.0 | 10.0 | 10.0 |
| $Al_2O_3$ | | | | |
| $Na_2O$ | | | | |
| $K_2O$ | | | | |
| BaO | 38.0 | 40.0 | 33.0 | 33.0 |
| $TiO_2$ | | | | |
| $Nb_2O_5$ | 37.0 | 35.0 | 42.0 | 40.0 |
| PbO | | | | |
| $Sb_2O_3$ | 0.1 | 0.1 | 0.1 | 0.1 |
| OTHERS | $Ta_2O_5$ | ZnO | CaO | SrO |
| | 5.0 | 5.0 | 5.0 | 7.0 |
| $\epsilon$ | 18.4 | 17.2 | 18.6 | 18.2 |
| $\tan \delta$ | $7.0 \times 10^{-4}$ | $11.0 \times 10^{-4}$ | $8.7 \times 10^{-4}$ | $8.0 \times 10^{-4}$ |
| $\rho/\Omega \cdot cm$ | $2.0 \times 10^{16}$ | $1.9 \times 10^{16}$ | — | $2.2 \times 10^{16}$ |
| $\alpha/K^{-1}$ | $86 \times 10^{-7}$ | $82 \times 10^{-7}$ | $86 \times 10^{-7}$ | $84 \times 10^{-7}$ |
| nd | 1.8789 | 1.8561 | 1.8799 | 1.8729 |
| vd | 27.0 | 29.2 | 27.3 | 27.6 |

TABLE 4

| | EXAMPLES | | | |
|---|---|---|---|---|
| | No. 13 | No. 14 | No. 15 | No. 16 |
| $SiO_2$ | | | | |
| $B_2O_3$ | 9.9 | 9.9 | 9.9 | 9.9 |
| $P_2O_5$ | 13.0 | 15.0 | 15.0 | 20.0 |
| $Al_2O_3$ | | | | |
| $Na_2O$ | | | | |
| $K_2O$ | | | | |
| BaO | 35.0 | 28.0 | 30.0 | 25.0 |
| $TiO_2$ | | | | |
| $Nb_2O_5$ | 42.0 | 47.0 | 45.0 | 45.0 |
| PbO | | | | |
| $Sb_2O_3$ | 0.1 | 0.1 | 0.1 | 0.1 |
| OTHERS | | | | |
| $\epsilon$ | 18.6 | 20.0 | 19.1 | 17.9 |
| $\tan \delta$ | $9.0 \times 10^{-4}$ | $11.0 \times 10^{-4}$ | $9.0 \times 10^{-4}$ | $9.4 \times 10^{-4}$ |
| $\rho/\Omega \cdot cm$ | $1.8 \times 10^{16}$ | $1.6 \times 10^{16}$ | — | $2.0 \times 10^{16}$ |
| $\alpha/K^{-1}$ | $81 \times 10^{-7}$ | $79 \times 10^{-7}$ | $82 \times 10^{-7}$ | $78 \times 10^{-7}$ |
| nd | 1.8737 | 1.8901 | 1.8791 | 1.8544 |
| vd | 26.0 | 23.6 | 24.5 | 24.4 |

TABLE 5

| | EXAMPLES | | | |
|---|---|---|---|---|
| | No. 17 | No. 18 | No. 19 | No. 20 |
| $SiO_2$ | | | | |
| $B_2O_3$ | 9.9 | 9.9 | 1.9 | 9.9 |
| $P_2O_5$ | 10.0 | 10.0 | 10.0 | 10.0 |
| $Al_2O_3$ | | 5.0 | | |
| $Na_2O$ | | | | |
| $K_2O$ | | | | |
| BaO | 38.0 | 38.0 | 33.0 | 33.0 |
| $TiO_2$ | | | 2.0 | |
| $Nb_2O_5$ | 37.0 | 37.0 | 51.0 | 42.0 |
| PbO | | | | |
| $Sb_2O_3$ | | | 0.1 | 0.1 |
| OTHERS | $Y_2O_3$ | | $GeO_2$ | MgO |
| | 5.0 | | 2.0 | 5.0 |
| $\epsilon$ | 17.5 | 16.0 | 26.5 | 19.0 |

TABLE 5-continued

| | EXAMPLES | | | |
|---|---|---|---|---|
| | No. 17 | No. 18 | No. 19 | No. 20 |
| $\tan \delta$ | $10.0 \times 10^{-4}$ | $12.0 \times 10^{-4}$ | $5.1 \times 10^{-4}$ | $9.0 \times 10^{-4}$ |
| $\rho/\Omega \cdot cm$ | — | $2.5 \times 10^{16}$ | — | — |
| $\alpha/K^{-1}$ | $81 \times 10^{-7}$ | $80 \times 10^{-7}$ | $83 \times 10^{-7}$ | $83 \times 10^{-7}$ |
| nd | 1.8695 | 1.8368 | 1.9975 | 1.8850 |
| vd | 28.6 | 28.9 | 20.7 | 26.5 |

TABLE 6

| | EXAMPLES | |
|---|---|---|
| | No. 21 | No. 22 |
| $SiO_2$ | | |
| $B_2O_3$ | 9.9 | 12.9 |
| $P_2O_5$ | 10.0 | 7.0 |
| $Al_2O_3$ | | |
| $Na_2O$ | | |
| $K_2O$ | | 2.0 |
| BaO | 38.0 | 31.0 |
| $TiO_2$ | | |
| $Nb_2O_5$ | 37.0 | 46.0 |
| PbO | | |
| $Sb_2O_3$ | | 0.1 |
| OTHERS | $La_2O_3$ | $Li_2O$ |
| | 5.0 | 1.0 |
| $\epsilon$ | 17.9 | 20.0 |
| $\tan \delta$ | $9.7 \times 10^{-4}$ | $8.8 \times 10^{-4}$ |
| $\alpha/K^{-1}$ | $81 \times 10^{-7}$ | $89 \times 10^{-7}$ |
| nd | 1.8700 | 1.8992 |
| vd | 29.0 | 25.3 |

TABLE 7

| | COMPARATIVE EXAMPLE | | | |
|---|---|---|---|---|
| | No. A | No. B | No. C | No. D |
| $SiO_2$ | | | | |
| $B_2O_3$ | 24.48 | 13.44 | 10.32 | 6.03 |
| $P_2O_5$ | 44.37 | 27.24 | 34.20 | 28.49 |
| $Al_2O_3$ | | | | 2.41 |
| $Na_2O$ | | | | 6.19 |
| $K_2O$ | | 16.96 | 6.84 | |
| BaO | | | | |
| $TiO_2$ | | | | 4.38 |
| $Nb_2O_5$ | 31.15 | 42.36 | 34.62 | 52.5 |
| PbO | | | | |
| $Sb_2O_3$ | | | | |
| OTHERS | | | MgO 6.70 | |
| | | | CaO 7.32 | |
| $\epsilon$ | 8.6 | 12.2 | 11.5 | 21.12 |
| $\tan \delta$ | $13 \times 10^{-4}$ | $13 \times 10^{-4}$ | $14 \times 10^{-4}$ | $12 \times 10^{-4}$ |
| $\rho/\Omega \cdot cm$ | $1.5 \times 10^{13}$ | $3.8 \times 10^{14}$ | $2.8 \times 10^{15}$ | $3.8 \times 10^{12}$ |
| $\alpha/K^{-1}$ | $41 \times 10^{-7}$ | $87 \times 10^{-7}$ | $74 \times 10^{-7}$ | $54 \times 10^{-7}$ |
| nd | — | 1.7032 | 1.6983 | 1.8482 |
| vd | — | 29.2 | 32.2 | — |

As shown in Tables 1 to 7, every glass of the examples according to the present invention shows a high dielectric constant, low dielectric loss and high electrical resistivity. Further the glasses are transparent. In the glass of the examples according to the present invention, the coefficient of thermal expansion in temperature from 100 to 300° C. is in the range from $80 \times 10^{-7}$ to $86 \times 10^{-7} K^{-1}$, refractive index (nd) is in the range from 1.83 to 2.00, and Abbe number is from 20.7 to 29.2.

INDUSTRIAL APPLICABILITY

As described above, the glass of the present invention has a specific composition of a $P_2O_5$—RO—$Nb_2O_5$ system glass, shows a high dielectric constant, low dielectric loss and high electrical resistivity, and is useful as substrates for an electric circuit such as a high frequency circuit element, flat panel display and the like and dielectric materials.

The invention claimed is:

1. A glass comprising following components by mass %:

| | |
|---|---|
| $P_2O_5$ | 5-25% |
| BaO + SrO | 21-50% |
| $Nb_2O_5$ | 35-65% |
| $Li_2O + Na_2O + K_2O$ | 0-3%, |
| wherein $Nb_2O_5$/(BaO + SrO) is 0.85-2.20. | | wherein $Nb_2O_5$/(BaO+SrO) is 0.85-2.20.

2. A glass comprising following components by mass %:

| | |
|---|---|
| $P_2O_5$ | 5-25% |
| $B_2O_3$ | 0-15% |
| $SiO_2 + GeO_2$ | 0-5% |
| BaO + SrO | 21-50% |
| MgO + CaO | 0-25% |
| $Nb_2O_5$ | 35-65% |
| $TiO_2$ | 0-15% |
| $Ta_2O_5$ | 0-15% |
| $Bi_2O_3$ | 0-15% |
| ZnO | 0-15% |
| $WO_3$ | 0-15% |
| $Y_2O_3 + La_2O_3 + Gd_2O_3$ | 0-15% |
| $Li_2O + Na_2O + K_2O$ | 0-3% |
| $Al_2O_3$ | 0-5% |
| $Sb_2O_3$ | 0-0.5%, |
| wherein $Nb_2O_5$/(BaO + SrO) is 0.85-2.20. | |

3. A glass comprising following components by mass %;

| | |
|---|---|
| $P_2O_5$ | 5-20% |
| $B_2O_3$ | 0-10% |
| $SiO_2 + GeO_2$ | 0-5% |
| BaO | 21-50% |
| MgO + CaO | 0-25% |
| $Nb_2O_5$ | 35-65% |
| $TiO_2$ | 0-15% |
| $Ta_2O_5$ | 0-15% |
| $Bi_2O_3$ | 0-15% |
| ZnO | 0-15% |
| $WO_3$ | 0-15% |
| $Y_2O_3 + La_2O_3 + Gd_2O_3$ | 0-15% |
| $Li_2O + Na_2O + K_2O$ | 0-3% |
| $Al_2O_3$ | 0-5% |
| $Sb_2O_3$ | 0-0.5% |
| wherein $Nb_2O_5$/(BaO + SrO) is 0.85-2.20. | |

4. The glass as claimed in claim 1, wherein the glass is substantially free from PbO component.

5. The glass as claimed in claim 1, having a dielectric constant of 15 or more.

6. The glass as claimed in claim 1, having a dielectric loss of $10.0 \times 10^{-4}$ or less.

7. The glass as claimed in claim 1, having an electrical resistivity of $1.0 \times 10^{16}$ Ω·cm or more.

8. A glass substrate comprising the glass as claimed in claim 1.

9. The glass as claimed in claim 2, wherein the glass is substantially free from PbO component.

10. The glass as claimed in claim 2, having a dielectric constant of 15 or more.

11. The glass as claimed in claim 2, having a dielectric loss of $10.0 \times 10^{-4}$ or less.

12. The glass as claimed in claim 2, having an electrical resistivity of $1.0 \times 10^{16}$ Ω·cm or more.

13. A glass substrate comprising the glass as claimed in claim 2.

14. The glass as claimed in claim 3, wherein the glass is substantially free from PbO component.

15. The glass as claimed in claim 3, having a dielectric constant of 15 or more.

16. The glass as claimed in claim 3, having a dielectric loss of $10.0 \times 10^{-4}$ or less.

17. The glass as claimed in claim 3, having an electrical resistivity of $1.0 \times 10^{16}$ Ω·cm or more.

18. A glass substrate comprising the glass as claimed in claim 3.

\* \* \* \* \*

UNITED STATES PATENT AND TRADEMARK OFFICE
CERTIFICATE OF CORRECTION

PATENT NO.         : 7,396,786 B2                                          Page 1 of 1
APPLICATION NO.    : 10/501546
DATED              : July 8, 2008
INVENTOR(S)        : Masaaki Miyata and Kazuo Ohara It is certified that error appears in the above-identified patent and that said Letters Patent is hereby corrected as shown below:

Col. 7, Line 20, delete "wherein $Nb_2O_5/(BaO+SrO)$ is 0.85-2.20."

Signed and Sealed this

Twenty-sixth Day of August, 2008

JON W. DUDAS
*Director of the United States Patent and Trademark Office*